United States Patent [19]

Leger et al.

[11] 4,398,686

[45] Aug. 16, 1983

[54] TOWPLATE SYSTEM

[75] Inventors: James E. Leger, Enon; Patrick J. O'Brien, Dayton; Carl B. Mihlbachler, Fairborn, all of Ohio

[73] Assignee: The United States of America as represented by the Secretary of the Air Force, Washington, D.C.

[21] Appl. No.: 73,478

[22] Filed: Sep. 7, 1979

[51] Int. Cl.³ .............................................. B64D 1/12
[52] U.S. Cl. ................................................ 244/137 R
[58] Field of Search .............. 244/137 R, 138, 151 B, 244/137 L; 294/83 R, 83 A, 83 AA, 83 AB; 74/471 R

[56] References Cited

U.S. PATENT DOCUMENTS

| 2,868,581 | 1/1959 | Minty et al. | 244/151 B |
| 3,670,999 | 6/1972 | Leger | 244/137 R |
| 3,801,051 | 4/1974 | Hosterman et al. | 244/151 B |
| 3,865,333 | 2/1975 | Fielding et al. | 244/151 B |

OTHER PUBLICATIONS

John Bolender, "Coordination Sheet, Mission Systems, Trip Report", May 10, 1977.

Primary Examiner—Charles E. Frankfort
Attorney, Agent, or Firm—Donald J. Singer; Thomas L. Kundert

[57] ABSTRACT

A system for controlling the low altitude extraction of cargo from aircraft having a two part force transfer link assembly connected between drogue parachute and a main parachute. The link assembly is held in a tow-plate link release mechanism. The link assembly can be released by an electrical command signal from the aircraft cockpit or manually by a mechanical control system near the compartment bulkhead. The mechanical control includes a push-pull cable which operates the link release mechanism or which operates only a part of the link assembly to jettison the drogue parachute.

8 Claims, 10 Drawing Figures

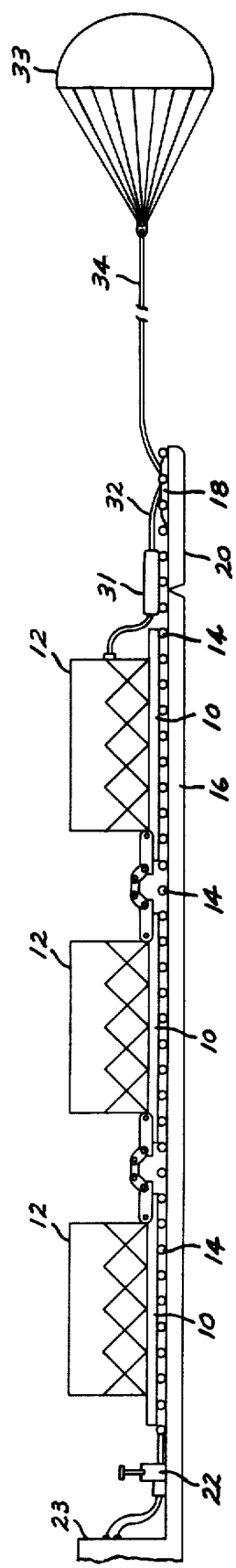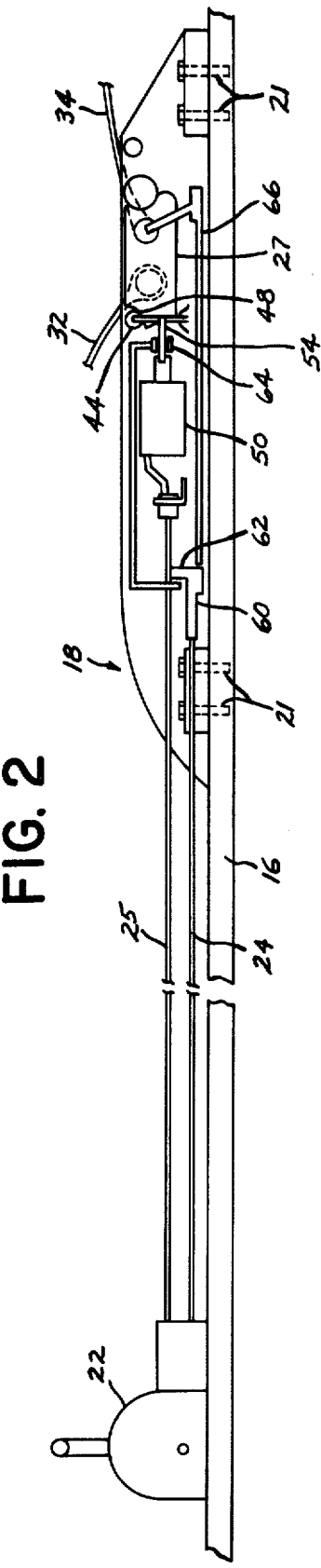
FIG. 1
FIG. 2

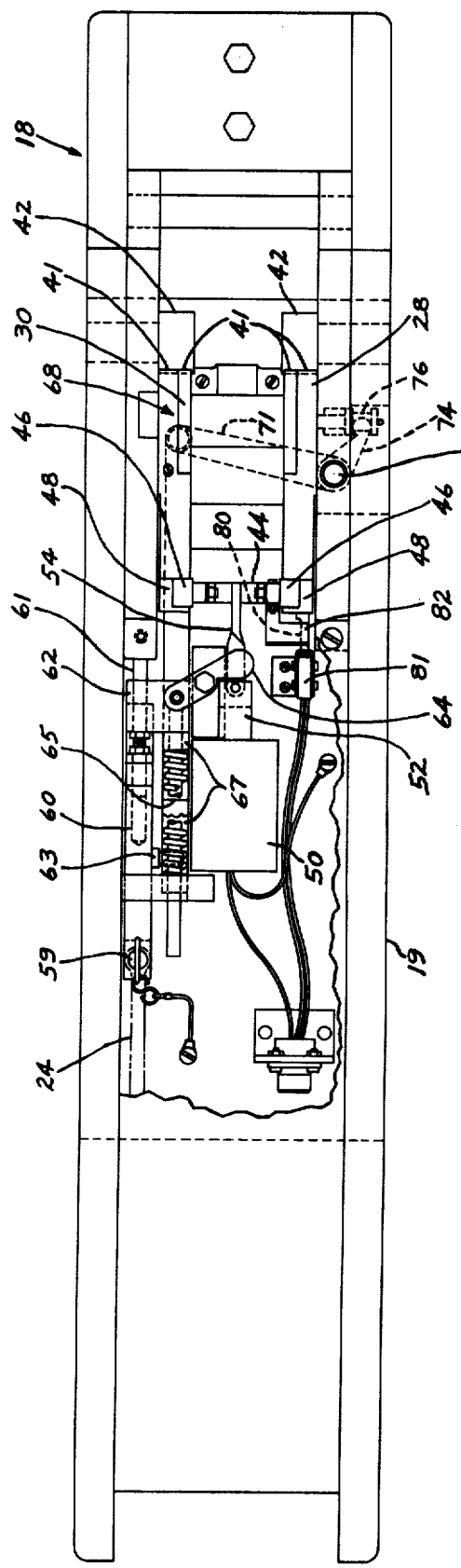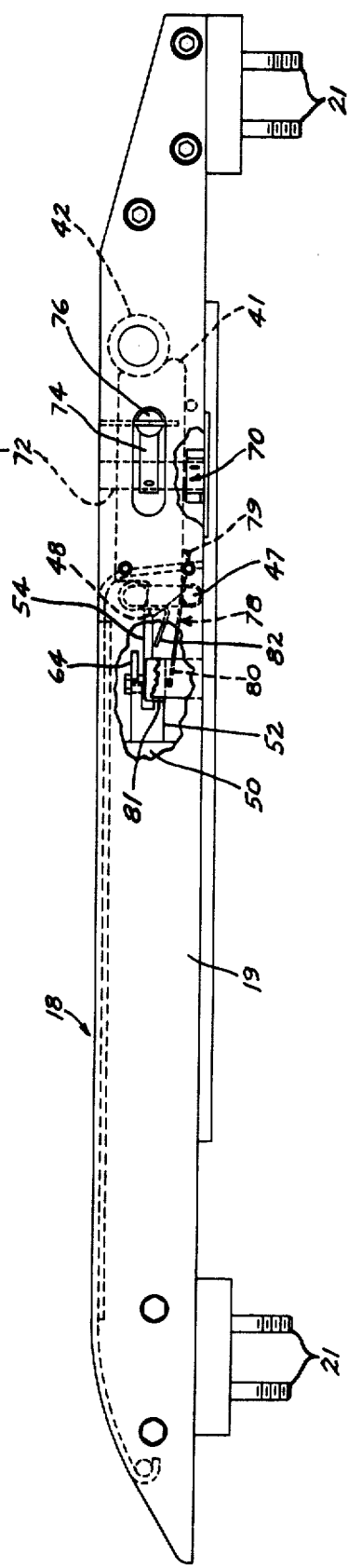

TOWPLATE SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to an improved towplate system for controlling the initiation of low altitude parachute extraction of cargo from an aircraft.

The patents to Cotton, U.S. Pat. No. 3,113,571; Kriesel, U.S. Pat. No. 3,396,924; Leger, U.S. Pat. No. 3,670,999; Hosterman et al., U.S. Pat. No. 3,801,051; and Fielding et al., U.S. Pat. No. 3,865,333, disclose various systems used in the extraction of cargo from an aircraft.

In the extraction of aircraft cargo at low altitudes a drogue parachute is first towed and then released, which acts to deploy the main parachute extraction system. One mechanism for coupling the drogue parachute to the main parachute, which was built for the Department of the Air Force, is called the Oxford towplate. It employed a two part force transfer link assembly having a first link member connected to the drogue parachute line and a second link member connected to a transfer line which, in turn, was connected to the main parachute. The two link members were also detachably coupled together. The Oxford towplate further employed a link release mechanism attached to the aircraft floor for retaining the link assembly until actuated for release of the assembly and thus the main parachute.

The link release mechanism was actuatable either electrically (automatically) or manually for causing release of the two-part link assembly. For electrically actuating the link release mechanism, a solenoid was coupled to a pivotal retainer member or latch of the release mechanism. When the solenoid was deenergized it positioned the retainer member in engagement with the two part link assembly so as to lock it into the link release mechanism. Upon being energized, the solenoid would pivot the retainer member away from the link assembly, allowing the deployed drogue parachute to then extract the link assembly from the release mechanism. The solenoid was selectively energized and deenergized by a switch located in the cockpit for use by the pilot.

Should the electrical circuit for the solenoid, or the solenoid itself, malfunction, a manual force transfer lever was provided, being connected by a push-pull cable to linkage in the link release mechanism. By moving the lever so as to pull the cable, the retainer member was manually pivoted away from the two part link assembly. The link assembly was then unlocked and extractible from the release mechanism by the drogue parachute. If some malfunction occurred or if conditions changed such that it was undesirable to deliver the cargo, a drogue release lever was provided to jettison the drogue parachute. The drogue release lever was connected by another push-pull cable to other linkage in the release mechanism for actuating cooperable pins which detachably coupled the first and second link members of the force transfer link assembly together. By moving the drogue release lever to pull its cable the second link member was manually detached from the first link member allowing the drogue parachute to be jettisoned without unlocking the first link from the release mechanism.

Effective performance of either of the above-described manual operations through use of the appropriate one of the two separate levers of the Oxford towplate required that the other lever be fully returned to a neutral position before the one lever was moved. Otherwise the linkage of the link release mechanism connected to other lever might interfere with or obstruct the performance of the one lever whether it be to transfer force from the drogue to the main parachute or release the drogue parachute alone. In field trials of the Oxford towplate, it was found that frequent adjustments needed to be made to the cables and linkages connected to the levers and even then satisfactory operation of the towplate could not be ensured.

BRIEF SUMMARY OF THE INVENTION

The present invention constitutes an improvement over the Oxford towplate in which the aforementioned problems are overcome and, additionally, other features are incorporated which enhance the acceptability of the overall operation of the improved towplate system. As in the Oxford towplate, the improved towplate system of the present invention employs a two part, force transfer link assembly between the drogue parachute and the main parachute which can be released either electrically from the aircraft cockpit or mechanically from a control box, located near the forward cargo compartment bulkhead. The electrical system makes use of a solenoid to release the link assembly. However, unlike the Oxford towplate, the improved towplate system of the present invention incorporates a single push-pull cable and has a control box near the cargo compartment bulkhead which includes an electrical solenoid override or disable switch and a mechanical control for operating the push-pull cable which operates a release for the main parachute. The pull-push cable can also be used to release only a part of the link assembly to effect jettisoning of the drogue parachute. The improved towplate assembly further incorporates electro-mechanical feedback controls connected between the control box and the towplate link release mechanism for sensing the presence of the two part link assembly in the hold of the release mechanism.

IN THE DRAWINGS

FIG. 1 is a schematic illustration showing a plurality of aerial delivery platform loads with the towplate system of the invention.

FIG. 2 is a schematic diagram of the towplate system, of FIG. 1, in greater detail.

FIG. 5 is a partially schematic partially cutaway side view of the link release mechanism of the device of FIGS. 1 and 2.

FIG. 6 is a partially schematic, partially cutaway top view of the device of FIG. 5.

DETAILED DESCRIPTION OF THE INVENTION

Figure 3:
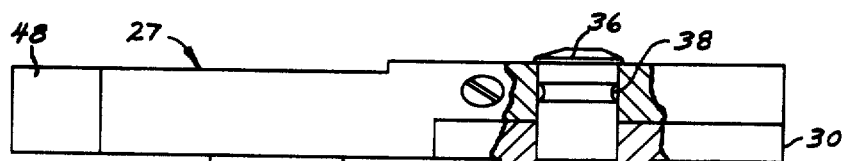
FIG. 3 is a partially cutaway view of the two part link assembly of the device of FIGS. 1 and 2.

Reference is now made to FIG. 1 of the drawing which shows a plurality of interconnected platforms 10 with a cargo load 12 on each platform. The platforms are supported on a pair of spaced apart roller conveyors, one of which is shown schematically at 14. The conveyors 14 are secured to the floor of the aircraft, indicated schematically at 16.

The improved towplate assembly of the present invention, including a link release mechanism 18, a two part link assembly and a towplate control assembly 22, has the link release mechanism 18 secured to the floor of the aircraft between the conveyors 14 on door member 20 by means of four bolts 21 and the control assembly secured to the floor of the aircraft near the compartment bulkhead indicated schematically at 23.

The link release mechanism 18 is operated from the control assembly 22 by means of the push-pull cable indicated schematically at 24 in FIG. 2 and a three-conductor cable 25. The push-pull cable 24 and three conductor cable 25 extend from the control assembly 22 to the link release mechanism 18 in the space between the spaced apart rollers 14. The push-pull cable used in the device constructed was a part of No. 244-612-BB made by Teleflex Corp.

Figure 4:
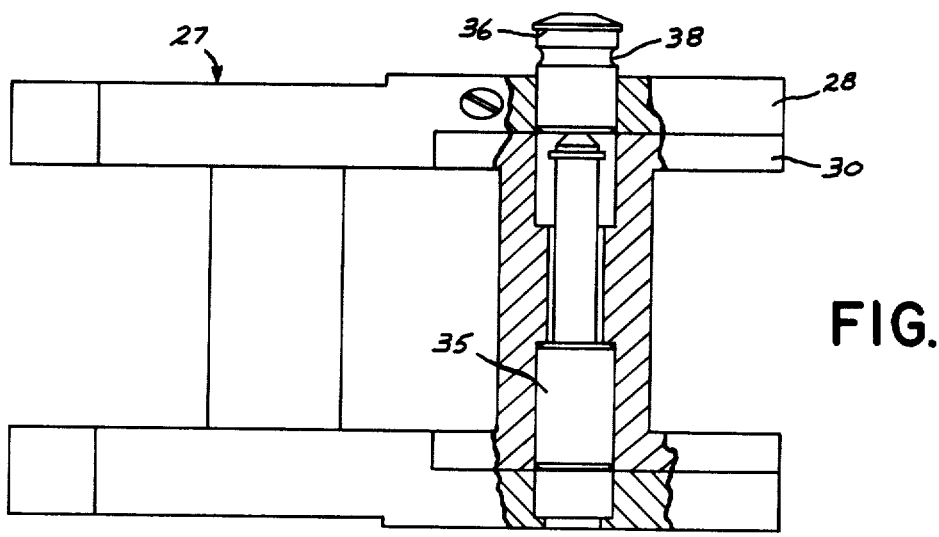
FIG. 4 is a topside view of the device of FIG. 3.

As shown in greater detail in FIGS. 3 and 4, the two part link assembly 27 has a first link member 28 connected to the main extraction parachute 31 through transfer line 32 and a second link member 30 connected to the drogue parachute 33 through drogue parachute line 34. The link member 30 is secured in the link member 28 by means of an ejector pin 35 and a release pin 36. The release pin 36 has a groove 38 for receiving spring loaded balls 39, one of which is shown, in detent members 40.

The link release mechanism 18 holds the two part link assembly in the towplate assembly as shown in FIGS. 5 and 6. The two link members 28 and 30 have bearing surfaces as indicated at 41 which engage bearing members 42. The portion of the release mechanism 18 for holding the link assembly in the towplate is a link retainer assembly 44 having a link retainer member 46 which engages notches 48 in the link member 28. The retainer assembly pivots around shaft 47 which has projections, not shown, which engage the link release mechanism housing 19.

A solenoid 50 has a solenoid plunger 52 which is secured to a solenoid link member 54. The link member 54 is secured to the retainer assembly 44. When the solenoid is energized, the retainer assembly 44 is drawn out of engagement with the link member notches 48 so that the drogue parachute extracts the link assembly 27 to deploy the main parachute 31.

The retainer assembly 44 can also be manually withdrawn from engagement with the link assembly notches 48 by means of push-pull cable 24 which is secured to a control bar 60 with a quick release pin 59. The other end of control bar 60 has a hole, not shown, which slides on a positioning rod 61. The control bar 60 engages a force transmission linkage 62 which is secured to a pivotable crank member 64. The crank member 64 engages the solenoid plunger 52. A pin 63 is supported on control bar 60 and moves in a slot 65 in a drogue release operating bar 67. The bar 67 is positioned beneath the force transmission linkage 62. A push on the cable 24 moves pin 63 in slot 65 as the bar 60 moves the linkage 62, the crank member 64, the plunger 52 and retracts the retainer assembly 44 in the same manner as if the solenoid were energized.

The control bar 60 is also connected, through pin 63, to a drogue release mechanism 68 which includes the operating bar 67 and a pivotable crank assembly 70. The crank assembly includes a crank arm member 71 which is secured to pivot pin 72. The member 71 passes across the towplate assembly beneath the link assembly 27. The crank assembly 70 also includes a crank arm member 74 which is secured to pivot pin 72. The crank arm member 74 engages link retainer operating pin 76 which acts to move the ejector pin 35. A pull on cable 24 causes pin 63 to pull on operating bar 67 which rotates crank assembly 70 to cause member 74 to push link retainer operating member 76 against the ejector pin 35 to move the pin 35 and release pin 36 to the position shown in FIG. 7. With the two ends of pin 35 aligned with the ends of link 30, the link member 30 is free to separate from link member 28 to jettison the drogue parachute. The schematic showing in FIG. 2 does not show the crank members 64 and 70 and is intended only to show the overall system and not the exact device constructed. However a device could be made to be operated in the manner shown in FIG. 2 wherein a pull on cable 24 would operate to release the two part link assembly and a push on the cable 24 would operate the drogue parachute jettison.

Figure 10:
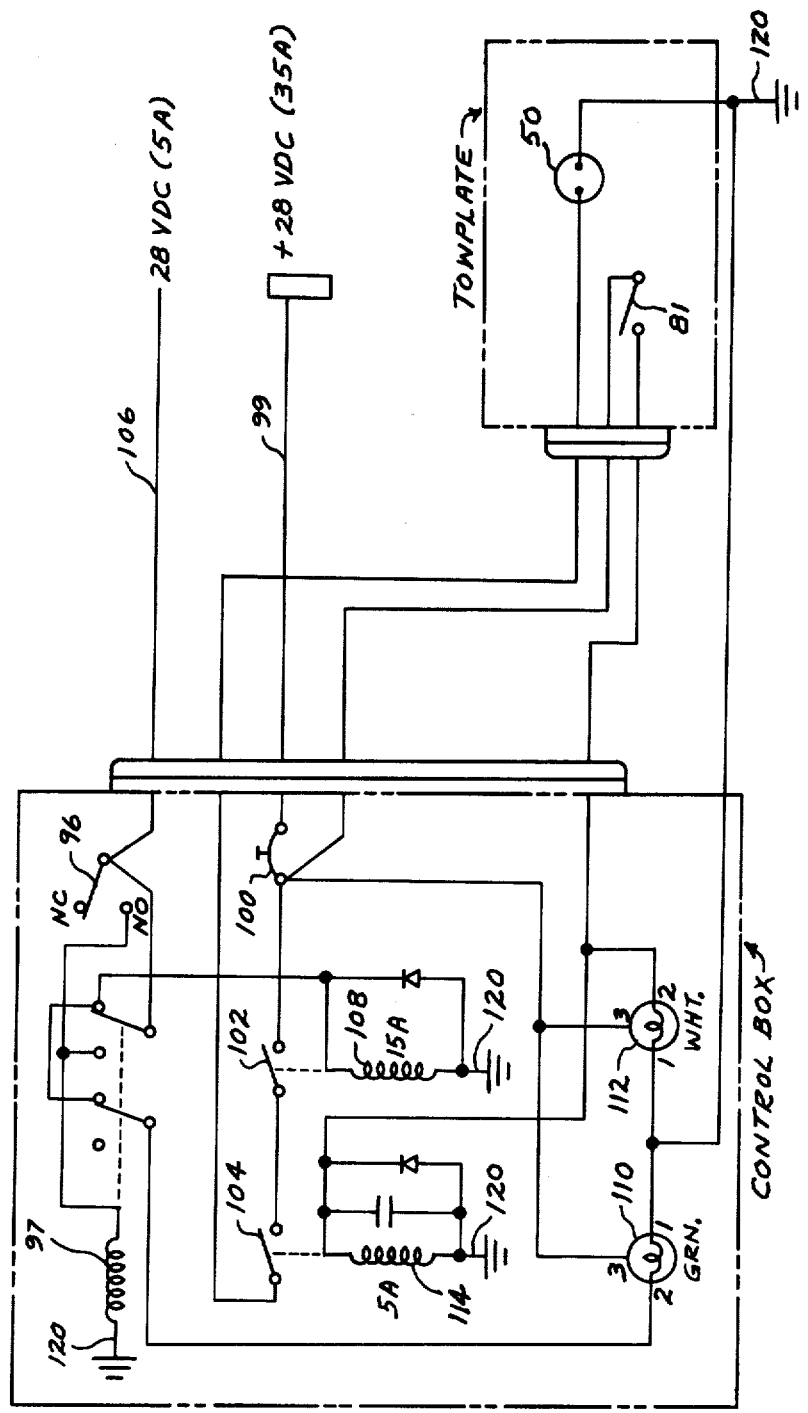
FIG. 10 is a schematic diagram of the control circuit for the device of FIGS. 1 and 2.

Referring now to FIGS. 5, 6, and 10, electromechanical feedback controls for sensing the presence of the link assembly 27 in the link release mechanism 18 include a spring 78 which passes around shaft member 47 on the retainer 44. The spring 78 is pivotable around the support 47 and has a first cantilever member 79 which engages the bottom of link assembly 27 and a second cantilever member 80 which engages the switch 81 when held against a switch 81 of the electromechanical feedback controls by the link assembly 27 pressing against cantilever member 79.

A control arm 82 is secured to the retainer assembly 44 and acts to move the spring cantilever member 80 out of engagement with switch 81 and open its contacts when assembly 44 moves out of engagement with notches 48. When the link 27 is not in place spring member 78 is free to rotate around member 47 even though the retainer assembly 44 is in the normal link lock position. The switch 81 is a conventional normally open momentary switch with the contacts being held closed by spring 78.

Figure 8:
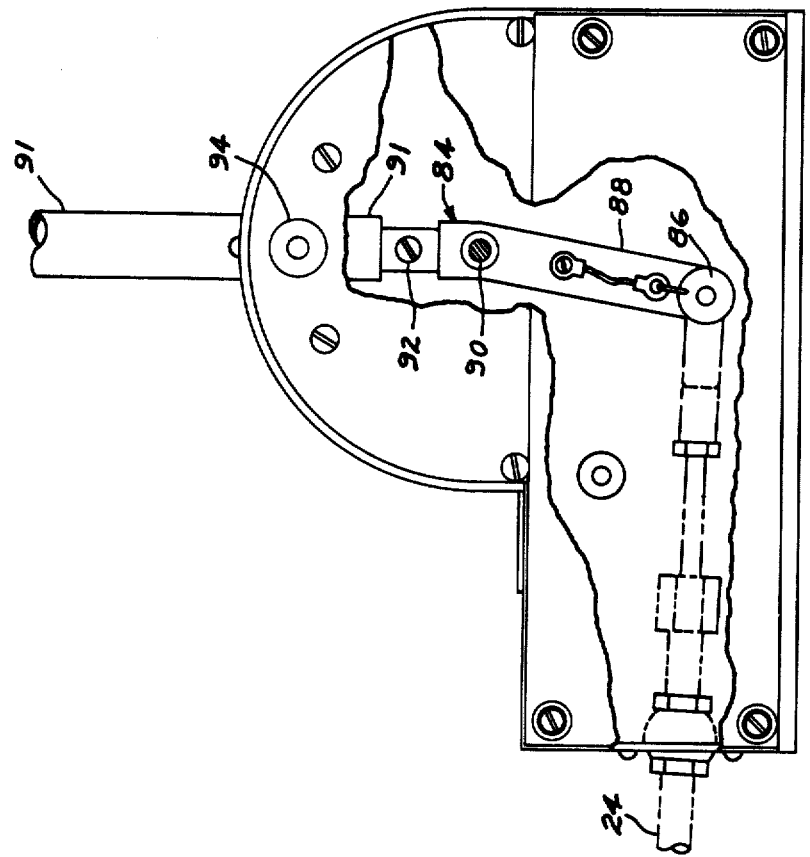
FIG. 8 is a partially schematic partially cutaway side view of the towplate control assembly for the device of FIGS. 1 and 2.
Figure 9:
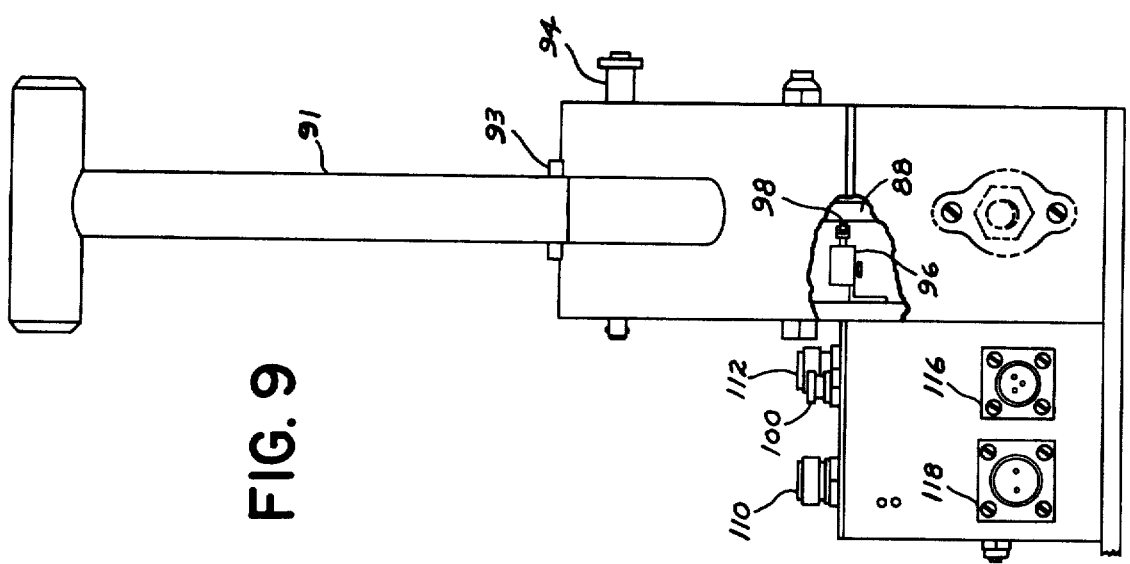
FIG. 9 is a partially cutaway right side view of the device of FIG. 8.

The tow plate control assembly 22 is shown in greater detail in FIGS. 8 and 9. The cable 24 is connected to a lever assembly 84 by means of a quick release pin 86. The lever assembly includes a crank arm 88 which pivots around pin 90 and is connected to the cable 24 and control handle assembly 91 by means of screw 92 and a self locking nut, not shown. The control handle assembly is normally locked against movement by a quick release pin 94. With pin 94 removed the handle 92 is held in position by detent members 93. A solenoid disable switch 96 is positioned adjacent the lever assembly 84 and is operated by switch bearing member 98 which contacts the crank arm 88. Movement of the switch 96 from its NC position to its NO position energizes a latch relay 97, as shown in FIG. 10.

The solenoid 50 is operated from a 28 volt DC supply connected to input line 99 through a circuit breaker 100 and relay contacts 102 and 104. With the control handle assembly 91 held in the center position by detent member 93, a cockpit command signal on line 106 is supplied to relay 108 to close contacts 102 and energize solenoid 50 to release the two part link assembly 27. The green light 110 on the control assembly 22 is also energized by the command signal on line 106. Upon release of the two part link assembly 27 control arm 82 opens switch 81 which deenergizes white light 112 and relay 114 which opens contacts 104 and deenergizes the solenoid 50.

For manual operation of the towplate assembly, quick release pin 94 is withdrawn so that control handle assembly 92 is free to move, except for the operation of detent members 93.

The three-conductor cable 25 is connected to the three-line input terminal 116. The command signal line 106 and power input line 99 are connected to the two-line input terminal 118. The return is through a common ground indicated at 120.

In the operation of the device when the link 27 is inserted in the link release mechanism 18 and the retainer 44 is locked in place in notches 48, the contacts in switch 81 are closed. When power is supplied on line 99, relay 114 is energized to close contacts 104. The pin 94, which prevents accidental movement of handle assembly 91, is removed when the aircraft approaches the drop area. After deployment of the drogue parachute, a cockpit initiated input on line 106 will light the green light 110 and will energize relay 108. The closing of relay contacts 102 energizes solenoid 50 which pulls the retainer assembly 44 away from notches 48 to release the two-part link assembly 27. The drogue parachute then acts to deploy the main parachute 31 to extract the platform loads from the aircraft.

If the white light remains lighted for a predetermined time after the green light is lighted, a malfunction in the electrical control is indicated. A crewman near the towplate control assembly 22 can then operate the release mechanically by moving handle 91 to the right in the showing in FIG. 8, which provides a push on cable 24. This moves the control bar 60 and forces transmission linkage 62, in FIG. 6, to the right which rotates crank arm 64 to move the solenoid plunger to the left. This will move the retainer assembly 44 out of engagement with notches 48 to cause extraction of the link assembly 27 from the link release mechanism 18 to deploy the main extraction parachute 32.

Figure 7:
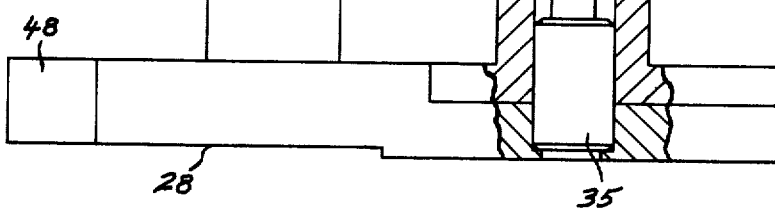
FIG. 7 shows the device of FIG. 3 in the drogue parachute release position.

If a malfunction occurs, a movement of handle assembly 92, to the left in FIG. 8, provides a pull on cable 24 which moves control bar 60, in FIG. 6, to the left. This moves the pin 63, in FIG. 6, to the left. Operating bar 67 is then moved to the left which rotates crank assembly 70 counterclockwise so that member 74 pushes operating member 76 against ejector pin 35 to move the ejector pin 35 to the position as shown in FIG. 7. This permits the drogue parachute to pull link member 30 out of link release mechanism 18 to jettison the drogue parachute. The link member 28 remains in the link release mechanism being held by retainer assembly 44.

There is thus provided a towplate assembly which is smaller, lighter and simpler than prior art devices and which is also easier to install and use.

We claim:

1. In a towplate system for use in an aircraft cargo extraction system wherein a drogue parachute is first released and acts to deploy a main parachute of the cargo extraction system, said towplate system including a two-part force transfer link assembly having a first link member connected to the drogue parachute and a second line member connected to the main parachute, means for releasibly coupling said first link member to the second link member, a link release mechanism secured to said aircraft and being actuatable for holding and releasing said link assembly, means responsive to an electrical command input for electrically actuating said link release mechanism to release said two-part link assembly from said link release mechanism, means for mechanically actuating said link release mechanism to release said two-part link assembly from said link release mechanism, said link release mechanism accordingly releasing said two-part link assembly when actuated by either of said electrical or mechanical actuating means and thereby allowing said drogue parachute to extract said two-part link assembly and said main parachute therewith, and means for mechanically actuating said coupling means for releasing the first link member from the second link member to thereby jettison the drogue parachute, the improvement which comprises:
a control assembly common to both said means for mechanically actuating said link release mechanism and said means for mechanically actuating said coupling means, said control assembly being movable in a first direction for actuating said link release mechanism and in a second direction for actuating said coupling means, said control assembly being capable of movement in only one of said first and second directions at a time.

2. The towplate system as recited in claim 1 wherein the improvement further comprises:
means responsive to the movement of said control assembly in either one of said first and second directions for disabling said electrical actuating means.

3. The towplate system as recited in claim 1, wherein said control assembly includes:
a movable control handle;
a push-pull cable connected at one end to said handle and interconnected at the other end to said link release mechanism and said coupling means such that movement of said handle in said first direction actuates said link release mechanism, while movement of said handle in said second direction being opposite to said first direction actuates said coupling means.

4. The towplate system as recited in claim 3, wherein movement of said handle in said first direction pushes said cable, while movement of said handle in said second direction pulls said cable.

5. The towplate system as recited in claim 3, wherein the improvement further comprises:
means responsive to the movement of said control handle in either one of said first and second directions for disabling said electrical actuating means.

6. The towplate system as recited in claim 1, wherein said improvement further comprises:
electro-mechanical feedback controls for sensing the presence of said two part link assembly being held by said link release mechanism.

7. The towplate system as recited in claim 6, wherein said electro-mechanical feedback controls includes:
a normally open momentary switch positioned adjacent said link release mechanism;
spring means;

means for pivotally supporting said spring means adjacent said momentary switch and said link release mechanism;

said spring means having a first cantilever member projecting from said pivotal supporting means adjacent said link release mechanism and having a second cantilever member projecting from said pivotal supporting means adjacent said momentary switch such that, when said two part link assembly is held by said link release mechanism, said link assembly contacts said first cantilever member so as to force said second cantilever member into contact with said momentary switch to close the same; and means connected to said momentary switch for indicating release of said link assembly and for disabling said electrical actuating means when said momentary switch is open.

8. The towplate system as recited in claim 7, wherein said link release mechanism includes means positioned adjacent said second cantilever member for moving the second cantilever member away from the momentary switch and open the same when said link release mechanism is actuated to release said link assembly.

* * * * *